United States Patent Office 3,153,047
Patented Oct. 13, 1964

---

3,153,047
PIPERIDYLETHYLESTERS OF SULPHONAMIDO-
BENZOIC ACIDS
Ernst Jucker, Binningen, Basel-Land, and Adolf J. Lindenmann, Basel, Switzerland, assignors to Sandoz Ltd., Basel, Switzerland, a Swiss firm
No Drawing. Original application May 8, 1961, Ser. No. 108,308. Divided and this application Apr. 30, 1962, Ser. No. 191,267
2 Claims. (Cl. 260—293.4)

The present application is a division of our copending application Serial No. 108,308, filed May 8, 1961, now Patent No. 3,119,843.

The present invention relates to new sulphonamides having the structural Formula I

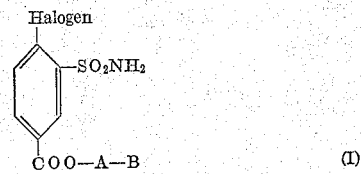

COO—A—B    (I)

wherein A represents methylene and ethylene and B is selected from the group consisting of nitrogen, oxygen and can also represent a sulphur-containing heterocyclic group linked with one of its carbon atoms to the radical A, their acid addition salts and pharmaceutical compositions containing, in addition to an inert carrier, a compound I and/or an acid addition salt thereof.

The sulphonamides of this invention and their acid addition salts can be prepared by reacting a compound of the general Formula II

HO—A—B    (II)

wherein A and B have the above significance, with a 3-sulphamyl-4-halogenobenzoyl chloride, and when an acid addition salt is required, salifying with an organic or inorganic acid.

Suitable meanings for the radical B are, for example, a 2- or 3-furyl or tetrahydrofuryl group, a 2-, 3- or 4-pyridyl or -piperidyl group, a 2-, 3- or 4-tetrahydropyranyl group, a 2-, 3- or 4-quinolyl group or a 2- or 3-thienyl group.

The preparation of the new sulphonamides can be carried out as follows: a suspension of 3-sulphamyl-4-chlorobenzoyl chloride is mixed with a compound II until complete dissolution has taken place. The excess of the compound II is removed by evaporation in a vacuum. The resulting oily residue is then rubbed to crystallize out the required ester which is then purified.

The compounds of the invention, which are at room temperature solid crystalline compounds, have interesting pharmacodynamic properties and/or may be used as intermediate compounds for the production of pharmaceuticals. The exemplified compound shows diuretic, sodium uretic and chloride uretic properties. In tests with dogs, it has been found to be effective on peroral administration.

The preparation of these compounds is more fully described in the following examples. It is to be understood, however, that the examples are illustrative of the compounds embraced by this invention and are not to be construed as limiting the invention to the particular compounds specifically described. All temperatures are stated in degrees centigrade.

EXAMPLE 1

*3-Sulphamyl-4-Chloro-Benzoic Acid [1,-Methyl-Piperidyl-(2')]-Ethyl Ester*

7.5 g. of 3-sulphamyl-4-chlorobenzoyl chloride are added portionwise to a solution of 4.3 g. of 1-methyl-2-β-hydroxyethyl piperidine and 3.5 g. of triethylamine in 20 cc. of benzene while being stirred, stirring being thereafter continued at 20–25° for another 96 hours in course of which a semi-solid, partly greasy mass separates off. The mixture is boiled down in a vacuum until dry, 200 cc. of acetic acid ethyl ester and 200 cc. of water are added to the evaporation residue, and the whole is well shaken. After filtering off undissolved substance and separating the layers, the acetic acid ethyl ester solution is united with the filtration residue. The solvent is driven off in a vacuum, the residue being briefly dried in vacuo and then chromatographed on alumina, the 3-sulphamyl-4-chlorobenzoic acid [1-methyl-piperidyl-(2')]-ethyl ester being eluted with a solvent mixture of chloroform and methanol in the proportion of 9:1. The hydrochloride is then prepared from the base in conventional manner with the aid of 20% ethanolic hydrochloric acid solution. When recrystallized from methanol the 3-sulphamyl-4-chloro-benzoic acid [1'-methyl-piperidyl-(2')]-ethyl ester hydrochloride melts at 178–180° with decomposition.

We claim:
1. A sulphonamide selected from the class consisting of a compound having the formula

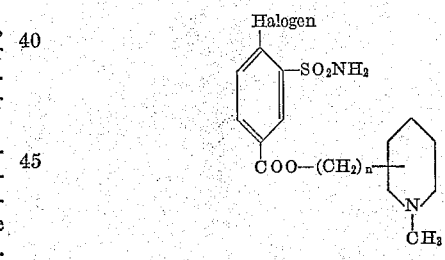

wherein $n$ represents one of the whole numbers 1 to 2 inclusive, and the acid addition salts of said compound with an acid selected from the group consisting of hydrochloric, hydrobromic, sulphuric, oxalic, tartaric, acetic, hexahydrobenzoic, methanesulphonic and fumaric acid.

2. 3 - Sulphamyl - 4 - chlorobenzoic acid [1' - methyl-piperidyl-(2')]-ethyl-ester.

No references cited.